(12) United States Patent
Nagayasu et al.

(10) Patent No.: US 11,565,345 B2
(45) Date of Patent: Jan. 31, 2023

(54) LASER PROCESSING DEVICE AND LASER PROCESSING METHOD

(71) Applicant: Panasonic Intellectual Property Management Co., Ltd., Osaka (JP)

(72) Inventors: Doukei Nagayasu, Hyogo (JP); Hitoshi Nishimura, Osaka (JP); Jingbo Wang, Hyogo (JP); Makoto Ryudo, Hyogo (JP); Masatoshi Nishio, Osaka (JP); Hideaki Yamaguchi, Osaka (JP); Yoshiaki Takenaka, Osaka (JP); Kiyotaka Eizumi, Osaka (JP); Ryo Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 749 days.

(21) Appl. No.: 16/408,681

(22) Filed: May 10, 2019

(65) Prior Publication Data

US 2019/0262938 A1 Aug. 29, 2019

Related U.S. Application Data

(63) Continuation of application No. PCT/JP2017/041178, filed on Nov. 16, 2017.

(30) Foreign Application Priority Data

Nov. 22, 2016 (JP) .............................. JP2016-226625

(51) Int. Cl.
*B23K 26/06* (2014.01)
*B23K 26/38* (2014.01)
(Continued)

(52) U.S. Cl.
CPC ........ *B23K 26/0643* (2013.01); *B23K 26/032* (2013.01); *B23K 26/064* (2015.10);
(Continued)

(58) Field of Classification Search
CPC .............. B23K 26/032; B23K 26/0613; B23K 26/064; B23K 26/0643; B23K 26/0648;
(Continued)

(56) References Cited

U.S. PATENT DOCUMENTS

| 5,272,309 A | 12/1993 | Goruganthu et al. |
| 5,302,798 A * | 4/1994 | Inagawa ............... B23K 26/382 219/121.77 |

(Continued)

FOREIGN PATENT DOCUMENTS

| DE | 10 2007 061 549 | 7/2009 |
| DE | 10 2009 050 784 | 5/2011 |

(Continued)

OTHER PUBLICATIONS

International Search Report of PCT application No. PCT/JP2017/041178 dated Dec. 26, 2017.
(Continued)

*Primary Examiner* — Tu B Hoang
*Assistant Examiner* — Vy T Nguyen
(74) *Attorney, Agent, or Firm* — Wenderoth, Lind & Ponack, L.L.P.

(57) ABSTRACT

Laser processing device (1) includes: laser-beam switching apparatus (70) that switches between a first optical path and a second optical path as an optical path along which a laser beam is to travel, the first optical path including first fiber (11), the second optical path including second fiber (21) that has a core diameter that is larger than a core diameter of first fiber (11); and processing head (80) that illuminates a same processed point on workpiece (900) with a laser beam that
(Continued)

has passed through the first optical path or the second optical path. When illumination with laser beam that has passed through the first optical path is performed for a predetermined period of time, laser-beam switching apparatus (70) switches from the first optical path to the second optical path.

4 Claims, 4 Drawing Sheets (51) Int. Cl.
   G02B 6/42      (2006.01)
   B23K 26/064    (2014.01)
   B23K 26/073    (2006.01)
   B23K 26/03     (2006.01)
(52) U.S. Cl.
   CPC ...... B23K 26/0613 (2013.01); B23K 26/0648 (2013.01); B23K 26/073 (2013.01); B23K 26/38 (2013.01); G02B 6/42 (2013.01)
(58) Field of Classification Search
   CPC .... B23K 26/067; B23K 26/073; B23K 26/38; G02B 6/42; B33Y 30/00; B22F 12/00; Y02P 10/25
   USPC ....... 219/121.66, 121.65, 121.83; 425/174.4; 264/497
   See application file for complete search history.

(56) References Cited

U.S. PATENT DOCUMENTS

| | | | | |
|---|---|---|---|---|
| 5,948,291 | A * | 9/1999 | Neylan | G02B 27/147 |
| | | | | 219/121.77 |
| 2007/0164005 | A1 * | 7/2007 | Matsuda | B23K 26/0673 |
| | | | | 219/121.61 |
| 2009/0206065 | A1 * | 8/2009 | Kruth | B23K 26/0665 |
| | | | | 219/121.66 |
| 2013/0134637 | A1 * | 5/2013 | Wiesner | B23K 26/067 |
| | | | | 264/497 |
| 2014/0072003 | A1 | 3/2014 | Matsumoto | |
| 2016/0361782 | A1 | 12/2016 | Saito et al. | |
| 2017/0304942 | A1 * | 10/2017 | Ogata | H01S 5/4087 |
| 2019/0126390 | A1 * | 5/2019 | Perfahl | B23K 26/034 |

FOREIGN PATENT DOCUMENTS

| | | |
|---|---|---|
| JP | 59-027791 | 2/1984 |
| JP | 7-256477 | 10/1995 |
| JP | 2001-252776 | 9/2001 |
| JP | 2002-316282 | 10/2002 |
| JP | 2003-211279 | 7/2003 |
| JP | 2005-095929 | 4/2005 |
| JP | 2007-237242 | 9/2007 |
| JP | 2012-24782 | 2/2012 |
| JP | 2015-188900 | 11/2015 |
| JP | 2015-217422 | 12/2015 |

OTHER PUBLICATIONS

Extended European Search Report dated Oct. 29, 2019 in related European Patent Application No. 17873665.8.
English Translation of Chinese Search Report dated Nov. 3, 2020 in related Chinese Patent Application No. 201780071133.X.
Communication pursuant to Article 94(3) EPC dated Oct. 7, 2021 for the related European Patent Application No. 17873665.8.

* cited by examiner

LASER PROCESSING DEVICE AND LASER PROCESSING METHOD

This application is a U.S. national stage application of the PCT International Application No. PCT/JP2017/041178 filed on Nov. 16, 2017, which claims the benefit of foreign priority of Japanese patent application No. 2016-226625 filed on Nov. 22, 2016, the contents all of which are incorporated herein by reference.

TECHNICAL FIELD

The present invention relates to a laser processing device and a laser processing method that improve processing speed.

BACKGROUND ART

It is conventionally known that metal as a typical workpiece has a low absorption coefficient of laser beam in a solid state and a high absorption coefficient of laser beam in a molten state (see PTL 1, for example). That is, at a start of laser processing, a workpiece is solid and thus has a low absorption coefficient of laser beam. When the workpiece starts to melt, the workpiece has a high absorption coefficient of laser beam.

Further, it is known that laser processing has suitable condensed-beam diameters of laser beam (see PTL 2, for example).

In order to selectively use both a laser beam that has a condensed-beam diameter that is suitable for melting and a laser beam that has a condensed-beam diameter that is suitable for laser processing, some known laser processing devices perform illumination with a plurality of laser beams emitted from a plurality of laser oscillators. Illumination with each laser beam is performed at different times. Consequently, the laser processing devices perform laser processing with superimposed laser beams (see PTLs 3 and 4, for example).

Concretely, according to a laser processing device described in PTL 4, at a start of laser processing, a first laser oscillator emits a laser beam, and a condenser lens concentrates the emitted laser on a point to be processed. Then a second laser oscillator emits a laser beam, and the laser beam propagates through a fiber. A processing head concentrates the laser beam that has propagated through the fiber on the processed point. Consequently, laser processing is performed with two superimposed laser beams.

CITATION LIST

Patent Literatures

PTL 1: Unexamined Japanese Patent Publication No. 2001-252776 (FIG. 13)
PTL 2: Unexamined Japanese Patent Publication No. 1107-256477 (FIGS. 2 to 4)
PTL 3: Unexamined Japanese Patent Publication No. 2015-217422 (FIG. 5)
PTL 4: U.S. Pat. No. 5,272,309 (FIG. 8)

SUMMARY OF THE INVENTION

A conventional laser processing device includes two laser oscillators to perform laser processing. Consequently, timing of emission of a laser beam needs to be considered by controlling the two laser oscillators. Therefore, control becomes complicated.

If two laser oscillators are used, a second laser oscillator needs a rise time. That is, a period of time during which laser beam is stopped or a period of time during which power is low is necessary. Consequently, processing speed is slow.

The present invention is made in light of the above problems. It is an object of the present invention to provide a laser processing device that performs both illumination with a laser beam that has a condensed-beam diameter for melting that is suitable to melt a workpiece and illumination with a laser beam that has a condensed-beam diameter for processing that is suitable for laser processing, and improves laser-processing speed.

A laser processing device according to an aspect of the present invention includes: a laser-beam switcher that selectively switches between a first optical path and a second optical path as an optical path along which a laser beam is to travel, the first optical path including a first fiber, the second optical path including a second fiber that has a core diameter that is larger than a core diameter of the first fiber; a laser illuminator that illuminates a same processed point on a workpiece with a laser beam that has passed through the first optical path and a laser beam that has passed through the second optical path; and a controller that, when a predetermined condition is satisfied, causes the laser-beam switcher to switch from the first optical path to the second optical path.

According to the configuration, in order to quickly start laser processing, only switching to the first optical path of the laser beam allows illumination with the laser beam that has a condensed-beam diameter for melting that is suitable to melt a workpiece. Further, only switching to the second optical path of the laser beam allows illumination with the laser beam that has a condensed-beam diameter for processing that is suitable for laser processing.

That is, at a start of laser processing, the laser beam that has a small diameter and a high power density is used to melt the workpiece. Then the laser beam that has a condensed-beam diameter that is suitable for laser processing is used to successively process the workpiece.

Two laser oscillators are conventionally used. In such a conventional case, a second laser oscillator needs a rise time. The rise time becomes unnecessary according to the configuration. That is, a period of time during which laser beam is stopped or a period of time during which power is low becomes unnecessary. Consequently, laser-processing speed is improved.

According to an aspect of the present invention, only making a switch between optical paths of one laser beam allows processing with the laser beam that has a small diameter and a high power density at a start of laser processing, and successive laser processing with the laser beam that has a condensed-beam diameter that is suitable for laser processing. Consequently, laser-processing speed is improved.

DESCRIPTION OF EMBODIMENTS

Hereinafter, exemplary embodiments of the present invention will be described with reference to the drawings. The following description of preferable exemplary embodiments is merely illustrative in nature and is not intended to limit the present invention, application, or uses.

First Exemplary Embodiment

Figure 1:
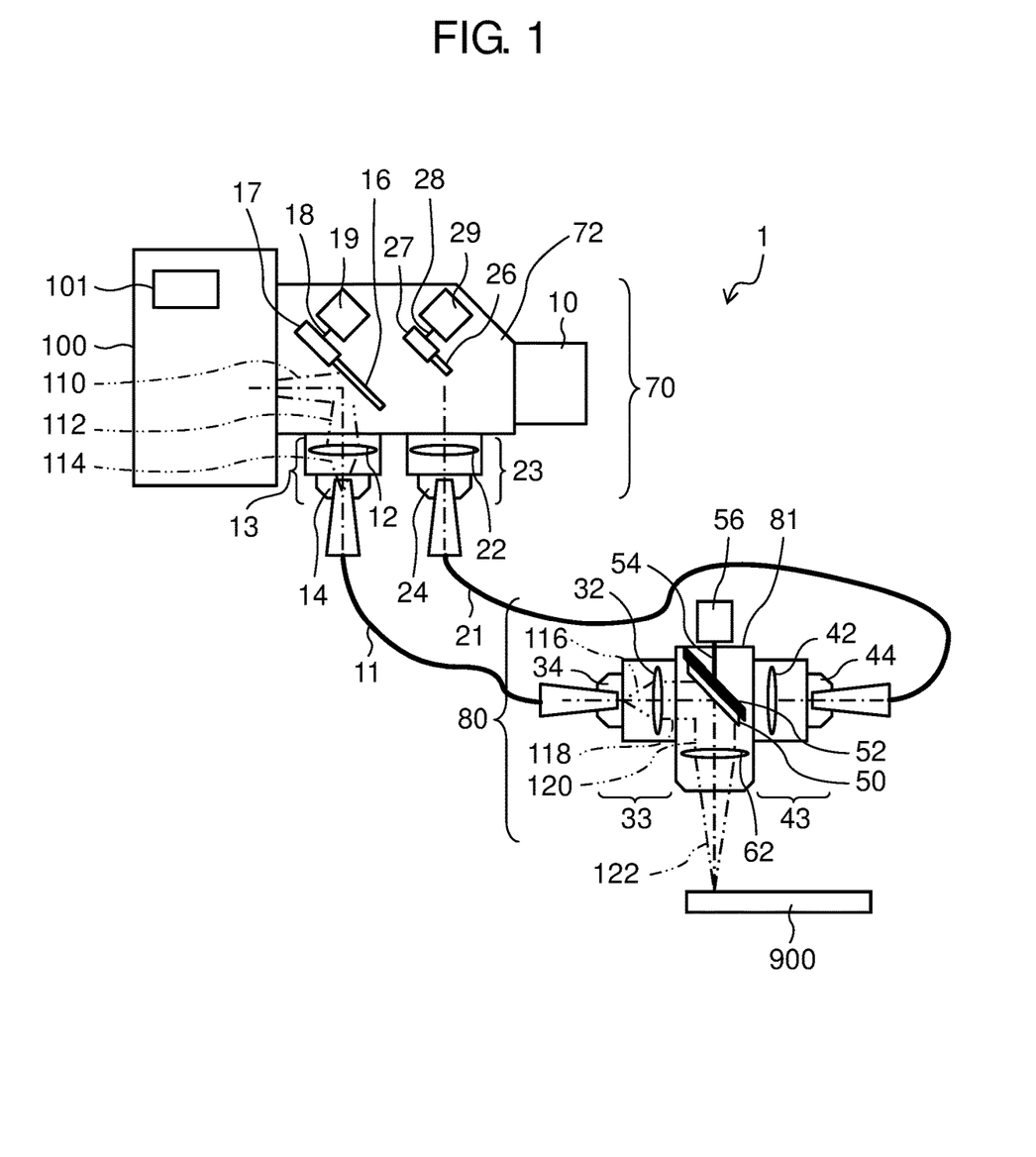
FIG. 1 is a block diagram that illustrates a main configuration of a laser processing device according to a first exemplary embodiment.
Figure 2:
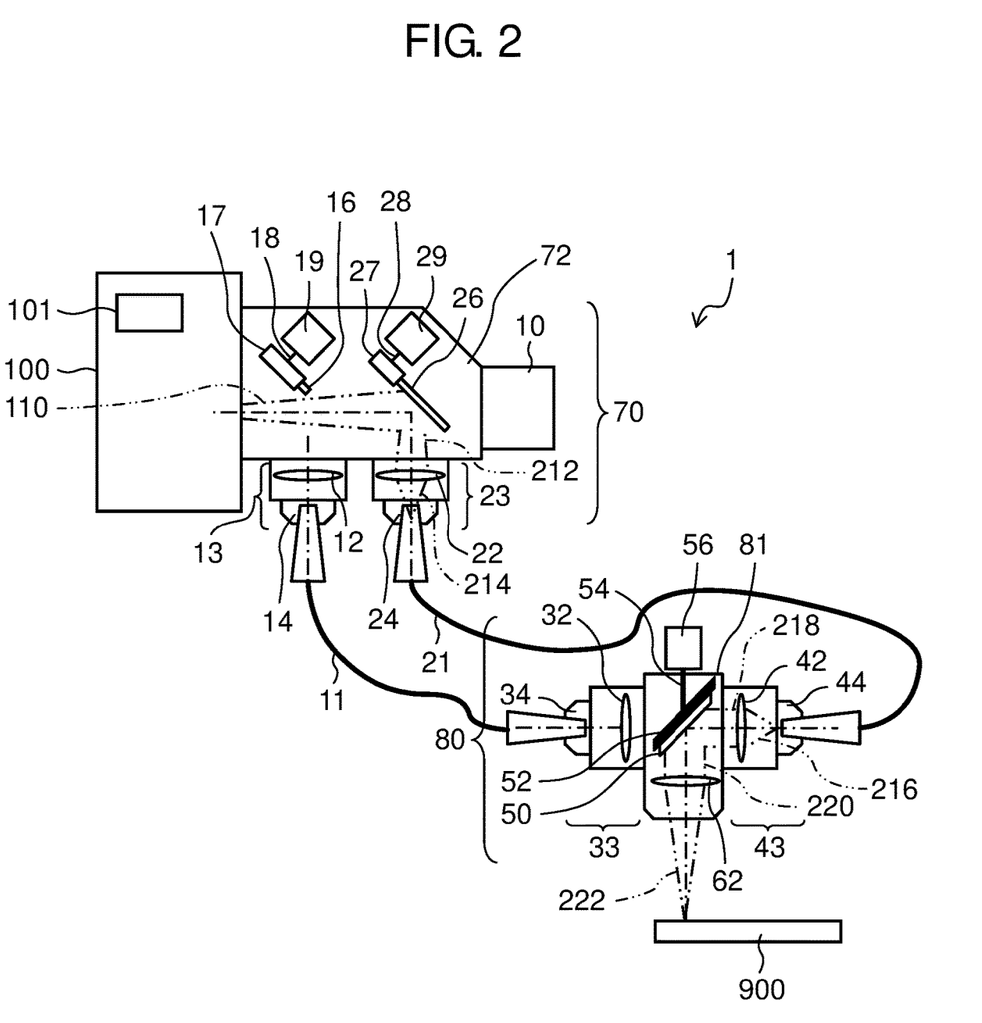
FIG. 2 corresponds to FIG. 1 in which an optical path of a laser beam is switched.

As illustrated in FIGS. 1 and 2, laser processing device 1 includes laser oscillator 100 as a laser source, laser-beam switching apparatus 70 (laser-beam switcher) that selectively switches between a first optical path and a second optical path as an optical path along which laser beam 110 is to travel, processing head 80 (laser illuminator) that illuminates workpiece 900 with a laser beam, and first fiber 11 and second fiber 21 that form the first and second optical paths, respectively.

For example, laser oscillator 100 emits a high-power laser beam that is 4 kW and has near-infrared wavelength that has a central wavelength of 976 nm. Laser oscillator 100 includes controller 101 that performs various control of operation of laser processing device 1.

Laser-beam switching apparatus 70 includes bending module 72 that bends a laser beam emitted from laser oscillator 100 to change an optical path of the laser beam and transmits the bent laser beam, first fiber-connection module 13 that directs the bent laser beam to first fiber 11, second fiber-connection module 23 that directs the bent laser beam to second fiber 21, and beam damper 10 that absorbs the laser beam.

Bending module 72 includes two bending mirrors 16, 26. For example, bending mirrors 16, 26 are each made from square silica that has a parallel flat sheet-like shape that is 30 mm by 30 mm by a thickness of 3 mm, and each include a high-reflectivity coating on a reflective surface.

Bending mirror 16 is fixed to bending-mirror holder 17. Bending-mirror holder 17 is connected to motor 19 through shaft 18. An instruction from controller 101 allows motor 19 to rotate. Rotation of motor 19 moves bending mirror 16.

Consequently, bending mirror 16 is moved between a bending position and a passing position. Bending mirror 16 is moved downward to the bending position to bend an optical path of laser beam 110 at a right angle in a horizontal plane. Alternatively, bending mirror 16 is moved upward to the passing position to pass laser beam 110 straight.

Similarly, bending mirror 26 is fixed to bending-mirror holder 27. Bending-mirror holder 27 is connected to motor 29 through shaft 28. An instruction from controller 101 allows motor 29 to rotate. Rotation of motor 29 moves bending mirror 26.

Consequently, bending mirror 26 is moved between a bending position and a passing position. Bending mirror 26 is moved downward to the bending position to bend an optical path of laser beam 110 at a right angle in a horizontal plane. Alternatively, bending mirror 26 is moved upward to the passing position to pass laser beam 110 straight.

First and second fiber-connection modules 13, 23 are disposed at positions that correspond to positions through which laser beams 112 (see FIG. 1), 212 (see FIG. 2) that have been bent at a right angle in a horizontal plane by bending mirrors 16, 26, respectively, exit bending module 72.

First fiber-connection module 13 includes condenser lens 12 that condenses laser beam 112, and receptacle 14 that holds an entrance-end side of first fiber 11.

For example, condenser lens 12 is made from synthetic silica as glass material, and has a diameter of 30 mm and a focal distance of 50 mm. Laser beam 114 condensed by condenser lens 12 enters first fiber 11.

For example, first fiber 11 is a silica single-core fiber that has a core diameter of 50 μm and a cladding diameter of 400 μm. First fiber 11 forms the first optical path through which laser beam 112 bent by bending mirror 16 passes.

Similarly, second fiber-connection module 23 includes condenser lens 22 that condenses laser beam 212, and receptacle 24 that holds an entrance-end side of second fiber 21.

Condenser lens 22 is made from synthetic silica as glass material, and has a diameter of 30 mm and a focal distance of 60 mm. Laser beam 214 condensed by condenser lens 22 enters second fiber 21.

Second fiber 21 is a silica double-clad fiber that has a core diameter of 100 μm, an inner-cladding diameter of 200 μm, and an outer-cladding diameter of 400 μm. Second fiber 21 has the core diameter that is larger than the core diameter of first fiber 11. Second fiber 21 forms the second optical path through which laser beam 212 bent by bending mirror 26 passes.

Beam damper 10 is disposed opposite to an emission opening through which laser beam 110 is emitted. An inside of beam damper 10 is filled with circulating cooling water.

Processing head 80 is used for laser processing of workpiece 900 (laser cutting in the present exemplary embodiment). For example, workpiece 900 is a mild-steel sheet that has a thickness of 1.6 mm (SS400).

Processing head 80 includes head main-body 81, first fiber-connection module 33 that is connected to an exit end of first fiber 11 and directs a beam that has exited through the exit end of first fiber 11 to head main-body 81, and second fiber-connection module 43 that is connected to an exit end of second fiber 21 and directs a beam that has exited through the exit end of second fiber 21 to head main-body 81.

First fiber-connection module 33 includes collimating lens 32 that collimates laser beam 116, and receptacle 34 that holds an exit-end side of first fiber 11. For example, collimating lens 32 is made from synthetic silica as a glass material, and has a diameter of 30 mm and a focal distance of 50 mm.

Similarly, second fiber-connection module 43 includes collimating lens 42 that collimates laser beam 216, and receptacle 44 that holds an exit-end side of second fiber 21. For example, collimating lens 42 is made from synthetic silica as a glass material, and has a diameter of 30 mm and a focal distance of 50 mm.

Head main-body 81 includes reflective mirror 50 that bends and changes an optical path of laser beam that has been directed into head main-body 81, and condenser lens 62 that condenses the laser beam bent by reflective mirror 50. The condensed laser beam is used for cutting.

For example, condenser lens 62 is made from synthetic silica as a glass material, and has a diameter of 50 mm and a focal distance of 100 mm. For example, reflective mirror 50 is made from synthetic silica as a glass material, has a long axis of 70 mm, a short axis of 50 mm, and a thickness of 5 mm, and includes a high-reflectivity coating on a reflective surface.

Reflective-mirror holder 52 holds reflective mirror 50. Reflective-mirror holder 52 is connected to motor 56 through shaft 54. Motor 56 is disposed out of head main-body 81. An instruction from controller 101 allows motor 56 to rotate. Rotation of motor 56 moves reflective mirror 50.

Consequently, a same processed point on workpiece 900 is illuminated with both laser beam 118 that has passed through the first optical path that includes first fiber 11 and laser beam 218 that has passed through the second optical path that includes second fiber 21.

<Operation of Laser Processing Device>

Hereinafter, operation of laser processing device 1 will be described. As illustrated in FIG. 1, rotation of motor 19 moves bending mirror 16 downward. Bending mirror 16 bends an optical path of laser beam 110 emitted from laser oscillator 100. The bent laser beam as laser beam 112 enters first fiber-connection module 13.

Laser beam 112 that has entered first fiber-connection module 13 is concentrated on a predetermined point by condenser lens 12. Laser beam 112 that has been concentrated enters a core of first fiber 11 through an entrance end of first fiber 11, propagates through first fiber 11, and exits through an exit end of first fiber 11.

Collimating lens 32 converts laser beam 116 that has exited through the exit end of first fiber 11 into laser beam 118 that is substantially collimated. Laser beam 118 enters head main-body 81.

Rotation of motor 56 rotates reflective mirror 50 to dispose a reflective surface opposite to collimating lens 32. Then reflective mirror 50 is stopped. Reflective mirror 50 bends an optical path of laser beam 118. Laser beam 118 that has been bent becomes laser beam 120.

Condenser lens 62 converts laser beam 120 into laser beam 122 that converges on workpiece 900. Laser cutting occurs at a focal point of laser beam 122. Laser beam 122 has a condensed-beam diameter of 100 μm at the focal point.

Workpiece 900 starts to be illuminated with laser beam 122, and then starts to melt at a point illuminated with laser beam 122, that is, a processed point. That is, the condensed-beam diameter of 100 μm of laser beam 122 is a condensed-beam diameter for melting.

A time workpiece 900 takes to start to melt can be measured in advance. According to the present exemplary embodiment, when illumination with laser beam 122 that has passed through the first optical path that includes first fiber 11 is performed for a predetermined period of time, controller 101 causes laser-beam switching apparatus 70 to switch to the second optical path that includes second fiber 21 as the optical path along which the laser beam 110 is to travel.

Concretely, while laser oscillator 100 continues to emit laser beam 110, rotation of motor 19 moves upward bending mirror 16 that has been moved downward, and rotation of motor 29 moves downward bending mirror 26. Next operation will be described with reference to FIG. 2.

As illustrated in FIG. 2, bending mirror 26 bends an optical path of laser beam 110 emitted from laser oscillator 100. The bent laser beam as laser beam 212 enters second fiber-connection module 23.

Laser beam 212 that has entered second fiber-connection module 23 is concentrated on a predetermined point by condenser lens 22. Laser beam 212 that has been concentrated enters a core of second fiber 21 through an entrance end of second fiber 21, propagates through second fiber 21, and exits through an exit end of second fiber 21.

Collimating lens 42 converts laser beam 216 that has exited through the exit end of second fiber 21 into laser beam 218 that is substantially collimated. Laser beam 218 enters head main-body 81.

Rotation of motor 56 rotates reflective mirror 50 to dispose a reflective surface opposite to collimating lens 42. Then reflective mirror 50 is stopped. Reflective mirror 50 bends an optical path of laser beam 218. Laser beam 218 that has been bent becomes laser beam 220.

Condenser lens 62 converts laser beam 220 into laser beam 222 that converges on workpiece 900. Laser cutting occurs at a focal point of laser beam 222. Laser beam 222 has a condensed-beam diameter of 200 μm at the focal point.

The same processed point where laser beam 122 has melted workpiece 900 is illuminated with laser beam 222. Laser beam 222 has been passed through the second optical path by switching an optical path of laser beam 110, and thus has power density that is lower than power density of laser beam 122. Workpiece 900 is illuminated with laser beam 222 instead of laser beam 122 to successively perform laser cutting of workpiece 900 after laser processing in which workpiece 900 starts to be melted by laser beam 122. That is, the condensed-beam diameter of 200 μm of laser beam 222 is a condensed-beam diameter for processing.

In the present exemplary embodiment, the laser beam has the condensed-beam diameter for processing of 0.2 mm on a front surface of workpiece 900 since 0.2 mm is suitable for laser cutting. In addition, processing head 80 may be configured to allow the laser beam to have a condensed-beam diameter less than or equal to 3 mm on a rear surface of workpiece 900 since the condensed-beam diameter on the rear surface is suitable for laser cutting.

According to the present exemplary embodiment, melting of workpiece 900 is inferred from a fact that illumination with laser beam 122 that passes through the first optical path that includes first fiber 11 is performed for a predetermined period of time. Then laser-beam switching apparatus 70 is caused to make a switch. However, the present invention is not limited to the present exemplary embodiment. Controller 101 may cause laser-beam switching apparatus 70 to make a switch when a predetermined condition is satisfied. The predetermined condition may infer melting of workpiece 900. Alternatively, a predetermined condition may show melting of workpiece 900. For example, a melting monitor (not shown) may monitor a state of melting of workpiece 900, and laser-beam switching apparatus 70 may be caused to make a switch based on signals from the melting monitor.

Although the laser beam enters the core of second fiber 21, the laser beam may enter an inner cladding, and the laser beam that exits the inner cladding has a doughnut-shaped transverse mode, and may be used for laser processing.

As described above, laser processing device 1 according to the present exemplary embodiment uses one laser beam 110, that is, includes one laser oscillator 100 to perform both illumination with laser beam 122 that has the condensed-beam diameter that is suitable to melt workpiece 900 and illumination with laser beam 222 that has the condensed-beam diameter that is suitable for laser processing.

Since a small condensed-beam diameter is used at a start of laser processing, power density of laser is high and workpiece 900 starts to melt after a short period of time. Then processing is performed with the condensed-beam diameter that is suitable for processing. Therefore, a laser-processing speed is improved, and a processing time becomes short.

Since laser-beam switching apparatus 70 is used, timing of emission of laser beams does not need to be considered by controlling two laser oscillators 100. A rise time necessary for second laser oscillator 100 when two laser oscillators 100 are used becomes unnecessary. That is, a period of time during which the laser beam is stopped or a period of time during which power is low becomes unnecessary.

Second Exemplary Embodiment

Hereinafter, the same parts as parts in the first exemplary embodiment are designated with the same reference marks, and only differences will be described.

Figure 3:
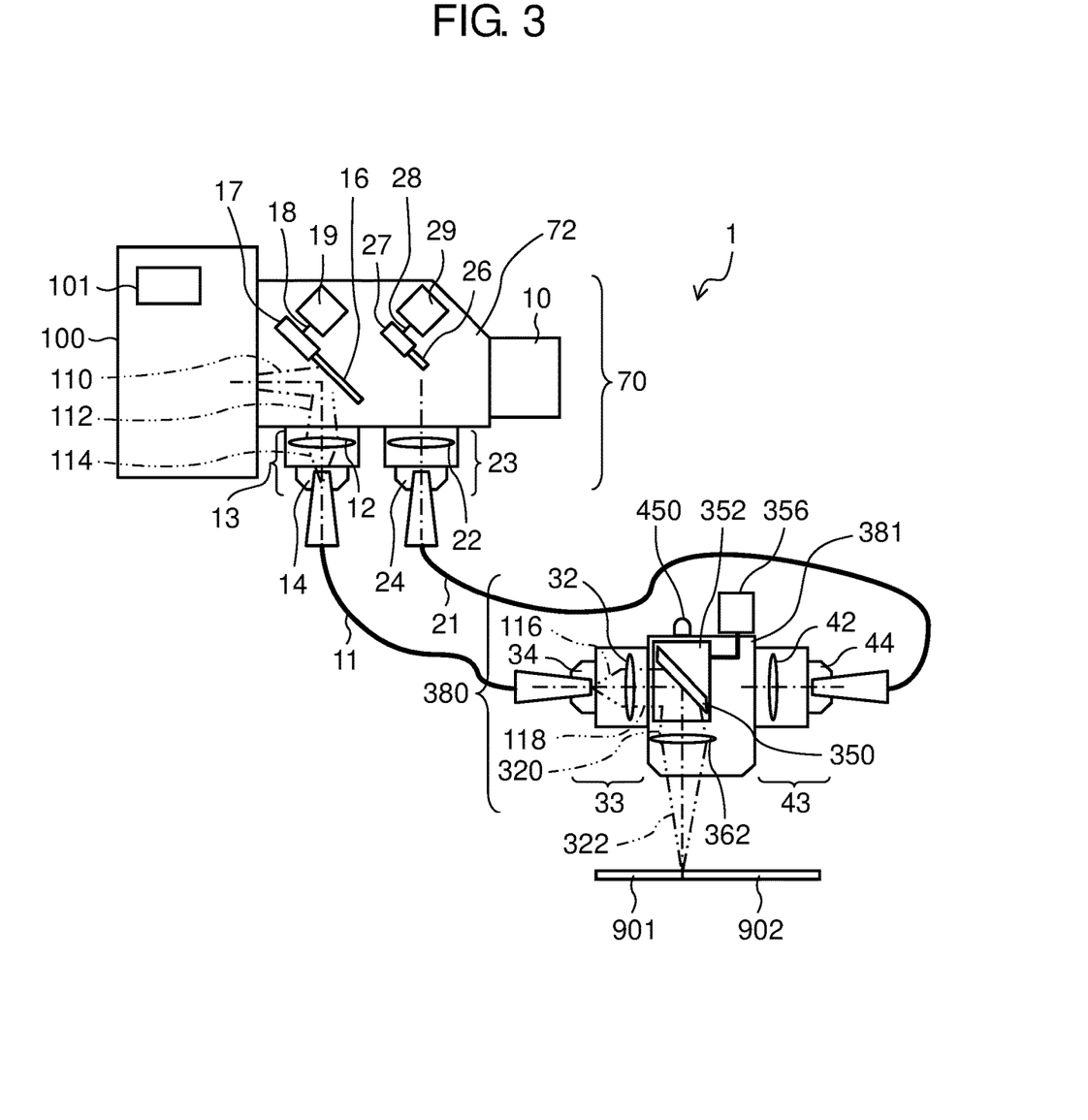
FIG. 3 is a block diagram that illustrates a main configuration of a laser processing device according to a second exemplary embodiment.
Figure 4:
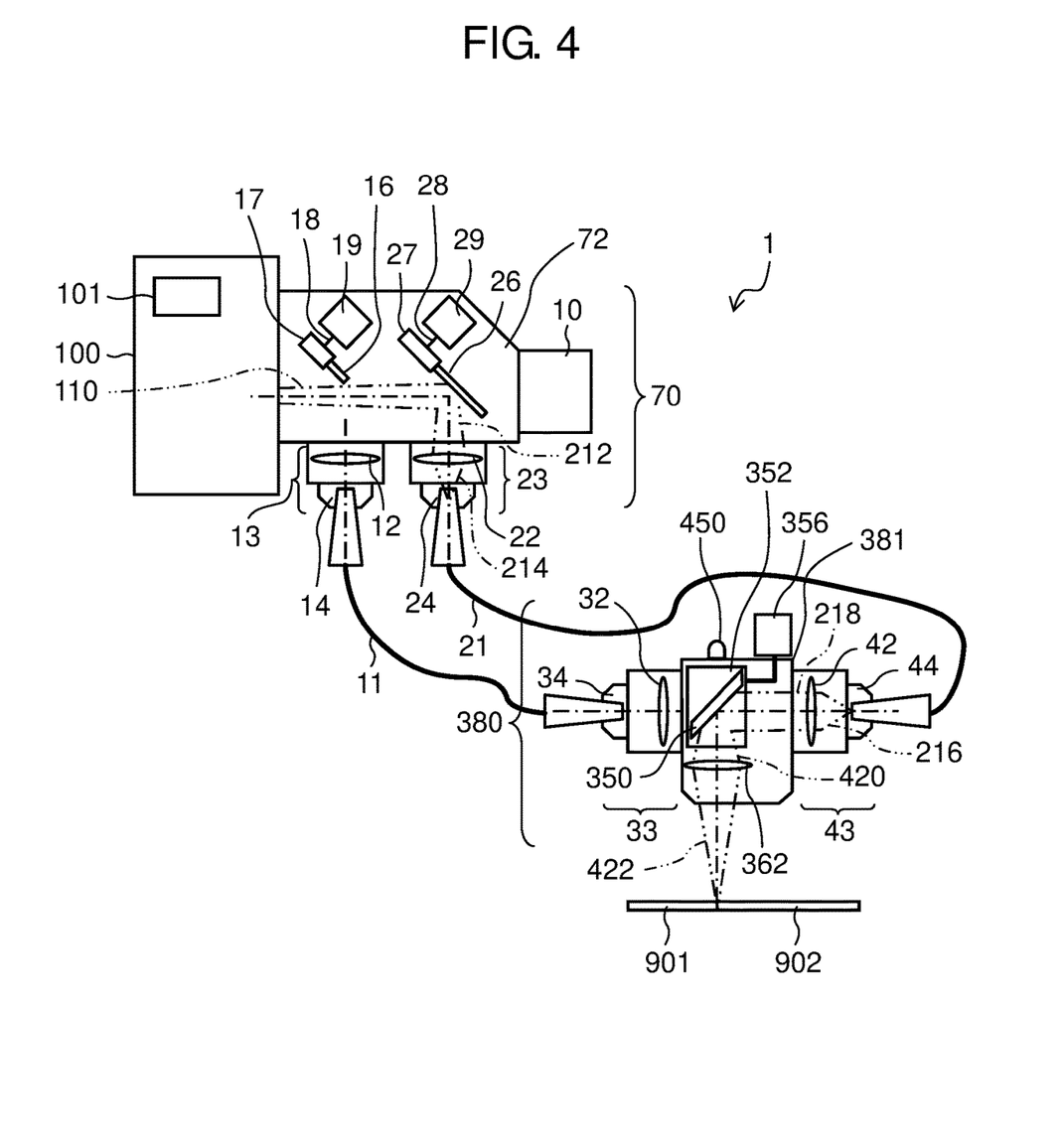
FIG. 4 corresponds to FIG. 3 in which an optical path of laser beam is switched.

As illustrated in FIGS. 3 and 4, processing head 380 is used for laser processing (laser welding in the present exemplary embodiment) of workpieces 901, 902. For example, workpieces 901, 902 are each a stainless sheet (SUS) that has a thickness of 0.8 mm.

Processing head 380 includes head main-body 381, first fiber-connection module 33 that is connected to an exit end of first fiber 11 and directs a beam that has exited through the exit end of first fiber 11 to head main-body 381, and second fiber-connection module 43 that is connected to an exit end of second fiber 21 and directs a beam that has exited through the exit end of second fiber 21 to head main-body 381.

Head main-body 381 includes reflective mirror 350 that bends and changes an optical path of the laser beam that has been directed into head main-body 381, and condenser lens 362 that condenses the laser beam bent by reflective mirror 350. The condensed laser beam is used for welding.

For example, condenser lens 362 is made from synthetic silica as glass material, and has a diameter of 50 mm and a focal distance of 200 mm. For example, reflective mirror 350 is made from synthetic silica as glass material, has a long axis of 70 mm, a short axis of 50 mm, and a thickness of 5 mm, and includes a high-reflectivity coating on a reflective surface.

Reflective mirror 350 is held by reflective-mirror holder 352 that is hollow and cylindrical. Reflective-mirror holder 352 is connected to motor 356 through a pulley (not shown).

Motor 356 is disposed out of head main-body 381. An instruction from controller 101 allows motor 356 to rotate. Rotation of motor 356 moves reflective mirror 350.

Consequently, a same processed point of workpieces 901, 902 is illuminated with both laser beam 322 that has passed through the first optical path that includes first fiber 11 and laser beam 422 that has passed through the second optical path that includes second fiber 21.

Photodiode 450 (detector) is disposed on an upper portion of head main-body 381. Photodiode 450 measures a reflected laser beam that is generated during laser processing to detect variation of the reflected laser beam.

<Operation of Laser Processing Device>

Hereinafter, operation of laser processing device 1 will be described. As illustrated in FIG. 3, bending mirror 16 bends an optical path of laser beam 110 emitted from laser oscillator 100. The bent laser beam passes through first fiber 11. The laser beam that has passed through first fiber 11 enters head main-body 381 as laser beam 118.

Rotation of motor 356 rotates reflective mirror 350 to dispose a reflective surface opposite to collimating lens 32. Then reflective mirror 350 is stopped. Reflective mirror 350 bends an optical path of laser beam 118. Laser beam 118 that has been bent becomes laser beam 320.

Condenser lens 362 converts laser beam 320 into laser beam 322 that converges on a portion where workpiece 901 and workpiece 902 are to be welded together. Laser welding occurs at a focal point of laser beam 322. Laser beam 322 has a condensed-beam diameter of 200 μm at the focal point.

At a start of laser welding, the portion where workpiece 901 and workpiece 902 are to be welded together starts to be illuminated with laser beam 322, and then starts to melt at a point illuminated with laser beam 322, that is, a processed point. That is, the condensed-beam diameter of 200 μm of laser beam 322 is a condensed-beam diameter for melting.

Photodiode 450 observes the reflected laser beam that is generated during laser processing of workpieces 901, 902. If an input of the reflected laser beam into photodiode 450 declines after a start of laser processing, controller 101 determines that workpieces 901, 902 have melted, and outputs a signal to stop emission of laser beam 110 from laser oscillator 100.

Next, laser-beam switching apparatus 70 is caused to switch from the first optical path that includes first fiber 11 to the second optical path that includes second fiber 21 as an optical path along which laser beam 110 is to travel, similarly as description in the first exemplary embodiment.

That is, laser oscillator 100 restarts to emit laser beam 110, and a switch from laser beam 116 that passes through first fiber 11 to laser beam 216 that passes through second fiber 21 is made.

A period of time from the stop of laser beam 110 to the restart of emission is shorter than a period of time from the stop of laser beam 110 to a time at which the portion melted by laser beam 322 releases heat and starts to solidify.

As illustrated in FIG. 4, bending mirror 26 bends an optical path of laser beam 110 emitted from laser oscillator 100. The bent laser beam passes through second fiber 21. The laser beam that has passed through second fiber 21 enters head main-body 381 as laser beam 218.

Rotation of motor 356 rotates reflective mirror 350 to dispose a reflective surface opposite to collimating lens 42. Then reflective mirror 350 is stopped. Reflective mirror 350 bends an optical path of laser beam 218. Laser beam 218 that has been bent becomes laser beam 420.

Condenser lens 362 converts laser beam 420 into laser beam 422 that converges on the portion where workpiece 901 and workpiece 902 are to be welded together. Laser welding occurs at a focal point of laser beam 422. Laser beam 422 has a condensed-beam diameter of 400 μm at the focal point.

The same processed point where laser beam 322 has melted workpieces 901, 902 is illuminated with laser beam 422. Workpieces 901, 902 are illuminated with laser beam 422 instead of laser beam 322 to successively perform laser welding of workpieces 901, 902 after laser processing in which workpieces 901, 902 start to be melted by laser beam 322. That is, the condensed-beam diameter of 400 μm of laser beam 422 is a condensed-beam diameter for processing.

Sizes of condensed-beam diameters at a processed point are used as a standard in the present exemplary embodiment. Alternatively, a difference between transverse modes of laser beam 322 and laser beam 422 may be used as another standard since a condensed-beam diameter depends on a luminous intensity distribution, that is, a transverse mode. In other words, laser beam 322 has an order mode that is lower than an order mode of laser beam 422.

A camera, such as a charge-coupled device (CCD), may be disposed instead of photodiode 450 to detect melting of workpieces 901, 902.

As described above, laser processing device 1 according to the second exemplary embodiment uses one laser beam, that is, includes one laser oscillator 100 to perform both illumination with the laser beam that has a condensed-beam diameter that is suitable to melt workpieces 901, 902 and illumination with the laser beam that has a condensed-beam diameter that is suitable for laser processing.

Further, since photodiode 450 that detects variation of the reflected laser beam is disposed over a center of rotation of reflective-mirror holder 352 that is hollow and cylindrical, photodiode 450 is opposite to a processed point of workpieces 901, 902 and grasps a state of processing, such as melting, welding, and cutting in real time.

INDUSTRIAL APPLICABILITY

As described above, a laser processing device according to an aspect of the present invention improves processing speed, and is useful for laser processing, for example.

REFERENCE MARKS IN THE DRAWINGS

1 laser processing device
11 first fiber
21 second fiber
70 laser-beam switching apparatus
80 processing head (laser illuminator)
100 laser oscillator
101 controller
110 laser beam
112 laser beam
114 laser beam
116 laser beam
118 laser beam
120 laser beam
122 laser beam
212 laser beam
214 laser beam
216 laser beam
218 laser beam
220 laser beam
222 laser beam
320 laser beam
322 laser beam
380 processing head (laser illuminator)
420 laser beam
422 laser beam
450 photodiode (detector)

The invention claimed is:

1. A laser processing device comprising:
a laser oscillator as a laser source;
a laser-beam switcher that selectively switches between a first optical path and a second optical path as an optical path along which a laser beam is to travel, the first optical path including a first fiber, the second optical path including a second fiber that has a core diameter that is larger than a core diameter of the first fiber;
a laser illuminator that illuminates a same processed point on a workpiece with a laser beam that has passed through the first optical path and a laser beam that has passed through the second optical path;
a controller located in the laser oscillator and configured to perform various control operations of the laser processing device including, when a predetermined condition is satisfied, control the laser-beam switcher to switch from the first optical path to the second optical path; and
a detector that detects variation of a reflected laser beam that is the laser beam that has been used to illuminate the workpiece and is reflected by the workpiece,
wherein when the detector detects variation of the reflected laser beam, the controller is configured to control the laser-beam switcher to switch from the first optical path to the second optical path,
in the first optical path, the laser oscillator, the laser-beam switcher, the first fiber, and the laser illuminator are arranged in this order, and
in the second optical path, the laser oscillator, the laser-beam switcher, the second fiber, and the laser illuminator are arranged in this order.

2. The laser processing device according to claim 1, wherein when illumination with the laser beam that has passed through the first optical path is performed for a predetermined period of time, the controller causes the laser-beam switcher to switch from the first optical path to the second optical path.

3. A laser processing method comprising:
a first illuminating step of illuminating a processed point on a workpiece with a first laser beam until a predetermined condition is satisfied, the first laser beam having been passed through a first optical path by making a switch between optical paths of a laser beam,
in the first optical path, a laser oscillator, a laser-beam switcher, a first fiber, and a laser illuminator are arranged in this order, and
a second illuminating step of illuminating, when the predetermined condition is satisfied, the processed point on the workpiece with a second laser beam that has been passed through a second optical path by making the switch between the optical paths of the one laser beam, and thus has power density that is lower than power density of the first laser beam,
in the second optical path, the laser oscillator, the laser-beam switcher, a second fiber, and the laser illuminator are arranged in this order,
wherein when variation of a reflected laser beam that is the first laser beam that has been used to illuminate the workpiece and is reflected by the workpiece is detected,
in the second illuminating step, the processed point is illuminated with the second laser beam.

4. The laser processing method according to claim 3, wherein when illumination with the first laser beam that has passed through the first optical path is performed for a predetermined period of time, in the second illuminating step, the processed point is illuminated with the second laser beam.

* * * * *